United States Patent
Arcidiacono et al.

(10) Patent No.: US 9,241,041 B2
(45) Date of Patent: Jan. 19, 2016

(54) METHOD FOR A PUSH SERVER TO BROADCAST DATA TO USER TERMINALS VIA AN INTERFACE DEVICE

(75) Inventors: Antonio Arcidiacono, Paris (FR); Daniele Vito Finocchiaro, Paris (FR); Sebastien Grazzini, Paris (FR); Alexandre Brunelle, Paris (FR)

(73) Assignee: EUTELSAT S A, Paris (FR)

( * ) Notice: Subject to any disclaimer, the term of this patent is extended or adjusted under 35 U.S.C. 154(b) by 347 days.

(21) Appl. No.: 13/387,453

(22) PCT Filed: Jul. 7, 2010

(86) PCT No.: PCT/EP2010/059765
§ 371 (c)(1),
(2), (4) Date: Mar. 22, 2012

(87) PCT Pub. No.: WO2011/012416
PCT Pub. Date: Feb. 3, 2011

(65) Prior Publication Data
US 2012/0172071 A1     Jul. 5, 2012

(30) Foreign Application Priority Data
Jul. 29, 2009   (FR) ...................................... 09 55315

(51) Int. Cl.
H04L 29/08       (2006.01)

(52) U.S. Cl.
CPC ............... *H04L 67/26* (2013.01); *H04L 67/28* (2013.01)

(58) Field of Classification Search
CPC ... H04L 65/4076; H04L 12/189; H04L 67/26; H04L 67/06; H04L 67/12; H04L 67/325; H04N 7/17318; H04N 21/25866
USPC ................................... 709/203, 204, 223, 232
See application file for complete search history.

(56) References Cited

U.S. PATENT DOCUMENTS

| | | | |
|---|---|---|---|
| 6,760,757 B1 | 7/2004 | Lundberg et al. | |
| 6,965,593 B2 * | 11/2005 | Donahue et al. | 370/352 |
| 8,000,259 B2 * | 8/2011 | Mills et al. | 370/252 |
| 8,346,941 B2 * | 1/2013 | Hinrichs et al. | 709/227 |
| 2001/0014103 A1 | 8/2001 | Burns et al. | |
| 2002/0129116 A1 | 9/2002 | Humphrey | |
| 2003/0026240 A1 * | 2/2003 | Eyuboglu et al. | 370/349 |
| 2004/0043770 A1 * | 3/2004 | Amit et al. | 455/450 |
| 2004/0068570 A1 | 4/2004 | Haller | |

(Continued)

OTHER PUBLICATIONS

International Search Report as issued for PCT/EP2010/059765.

*Primary Examiner* — Djenane Bayard
(74) *Attorney, Agent, or Firm* — Pillsbury Winthrop Shaw Pittman LLP

(57) ABSTRACT

A method for a push server to broadcast data to terminals via an interface device, the data sent by the server passing through a distribution system enabling the data to be broadcast from the server to the device. The server transmits a stream of content data and web application data to the system; the system multicasts the stream of content data and web application data to the device; a receptor in the interface device receives the data; the data are stored in a storage device of the interface device; a local wireless connection is established between a terminal provided with a web browser and the interface device; a HTTP query is transmitted from the terminal to a web server of the interface device, the query requesting the execution of an application stored in the storage device; and the requested application is executed in the browser of the terminal.

15 Claims, 1 Drawing Sheet

(56) References Cited

U.S. PATENT DOCUMENTS

| | | | |
|---|---|---|---|
| 2004/0203581 A1* | 10/2004 | Sharon et al. | 455/406 |
| 2008/0117920 A1* | 5/2008 | Tucker | 370/401 |
| 2011/0170842 A1* | 7/2011 | Krikorian | 386/291 |
| 2011/0196917 A1* | 8/2011 | Chidel et al. | 709/203 |
| 2013/0013709 A1* | 1/2013 | Bae et al. | 709/206 |

* cited by examiner

METHOD FOR A PUSH SERVER TO BROADCAST DATA TO USER TERMINALS VIA AN INTERFACE DEVICE

CROSS REFERENCE TO RELATED APPLICATIONS

This application is the U.S. National Stage of PCT/EP2010/059765, filed Jul. 7, 2010, which in turn claims priority to French Patent Application No. 0955315, filed Jul. 29, 2009, the entire contents of all applications are incorporated herein by reference in their entireties.

The present invention relates to a method for a push server to broadcast data to user terminals via an interface device. The invention finds a particularly interesting application in the context of broadcasting applications and contents to mobile user terminals via a satellite.

In the case of a high bandwidth broadband satellite telecommunication system, the satellite may be used bidirectionally, which is both to:

relay data sent by a principal ground station (connected to a Network Operating Center or NOC) to a plurality of ground terminals: this first point to multipoint type link constitutes the forward link;

relay data sent by the ground terminals to the principal ground station: this second multipoint to point type link constitutes the return link.

Today some satellites (this is particularly the case with S band satellites) are capable of integrating a payload ensuring the distribution of applications and contents to portable mobile terminals and vehicles.

However, such a configuration is likely to pose two major difficulties.

A first problem relates to the multitude of mobile terminals on the market, which implies that an application developer must adapt his services to each terminal.

A known solution for this first problem consists in using web applications provided through a web browser. These web applications enable application developers to provide a service without having to worry about the machine on which the service will be used. One example of such a solution is the GMail™ application that enables its e-mails to be consulted, filed or sent. GMail™ is a very efficient application that is as good as some conventional messaging clients and may be used on any terminal whatsoever offering an efficient web browser (PC, Mac, Smartphone, etc.).

The main constraint with web applications is that one must be connected to the Internet to access the service, unlike software stored on the terminal that does not require connectivity.

The second problem posed by the distribution of applications and contents by satellite to portable mobile terminals and vehicles resides in the fact that very few mobile terminals capable of directly receiving the signal transmitted by a satellite exist.

In this context, the present invention aims to provide a method for a push server to broadcast data to user terminals via an interface device, said method affecting as many terminals as possible, including terminals that are not adapted to receive satellite signals, while masking the specificities of each terminal from the eyes of the application developers by giving them the opportunity to reach a large population of terminals without multiplying the development efforts.

For this purpose, the invention proposes a method for a push server to broadcast data to user terminals via an interface device, said data sent by the push server passing through a distribution system enabling the data to be broadcast from said push server to said interface device, said interface device comprising:

reception means suitable for receiving data multicast by said distribution system in push mode;
means for storing said data;
a web server;
connection means suitable for establishing a local wireless connection with user terminals; said method comprising the following steps:

transmission by the push server of a stream of content data and web application data to the distribution system;
multicasting by the distribution system of a stream of content data and web application data to said interface device;
receiving said data by the receiving means suitable for receiving in push mode;
storage of said data in said storage means;
local connection of a terminal with a web browser to said interface device;
transmission of an HTTP query from said terminal to said web server, said query requesting the execution of an application stored in said storage means;
execution of the requested application in the web browser of said terminal.

The user terminal is preferentially a portable terminal such as a PMP "Portable Multimedia Player," a PDA "Personal Digital Assistant," a PND "Personal Navigation Device" or a mobile telephone.

The term "multicast broadcasting" includes broadcasting that may be of the "broadcast" type (global broadcasting of a same data stream to all interface devices) or of the "multicast" type with for example a first type of data sent globally to a first group of interface devices (for example consumer devices) and a second type of data, different from the first type, sent to a second group of interface devices (for example professional interface devices).

Thanks to the invention, it is possible to launch mobile services, particularly via a distribution system such as a satellite, without the user terminals being compatible with this distribution system. The user terminals do not have to be compatible with the reception of the satellite signal since they are connected to an interface device (also subsequently designated by the term "intelligent gateway") through a local wireless network of the WiFi type.

In addition, the terminal may, thanks to the method according to the invention, have access to the services while the interface device is outside of the coverage area, enabling the reception of data multicast by the data stream distribution system. The interface device serves as a buffer memory via its storage means in which the data are stored; These data are made accessible to the terminals via a wireless connection between the terminals and the interface device, even in the absence of coverage (for example in the absence of satellite coverage).

In addition, as the applications are executed through the Internet browser of the terminal, it is no longer necessary to develop several versions of applications so that the latter are compatible with the various terminals present on the market.

Lastly, this solution optimizes the satellite bandwidth utilized since the applications and data are sent by multicast type link (very suitable for satellite telecommunications).

It should be noted that the interface device according to the invention is an intelligent device. In other words, it does more than pick up signals that arrive from a satellite or a ground transmitter, transform these signals into WiFi signals to immediately retransmit them to a mobile terminal. The interface device continuously "listens to" and receives that which is broadcast by the push server; It stores this content and makes it accessible (as long as the content is stored) to the user terminals that connect to the interface device via the local wireless network.

The method according to the invention may also present one or more of the characteristics below, considered individually or according to all technically possible combinations:

the link between the interface device and the push server is a bidirectional link;

said distribution system is a telecommunications satellite;

the link between the push server and the interface device is a radiofrequency link between a principal ground station to which the push server is connected and the interface device via a telecommunications satellite;

the satellite is utilized bidirectionally such that the transmission of data from the push server to the interface device is carried out by utilizing the forward link of the satellite relaying the data transmitted by the principal ground station to the interface device and the transmission of data from the interface device to said push server is carried out by utilizing the return link of the satellite relaying the data transmitted by the interface device to the principal ground station;

said data are data of two types:
    content data integrated into the multimedia files;
    web applications intended to be executed locally on the user terminal;

multicast broadcasting by the distribution system of the stream of content data and web applications data is done to a plurality of interface devices, each interface device ensuring the distribution of these data to user terminals connected to this interface device via its local wireless connection.

Another object of the present invention is an interface device for the implementation of the method according to the invention characterized in that it comprises:

reception means suitable for receiving data multicast by said distribution system in push mode;

means for storing said data;

a web server;

connection means suitable for establishing a local wireless connection with user terminals.

The device according to the invention may also present one or more of the characteristics below, considered individually or according to all technically possible combinations:

the device according to the invention comprises transmission means suitable for transmitting data to said push server;

the device according to the invention comprises routing means suitable for routing the stored data to a user terminal connected to said interface device via said connection means;

le dispositif selon l'invention comporte une antenne satellitaire;

connection means able to establish a local wireless connection with user terminals are formed by WiFi, WiMax, BlueTooth connection means or by other types of wireless connection.

Another object of the present invention is an automobile integrating an interface device according to the invention.

Other characteristics and advantages of the invention will clearly emerge from the description given below, for indicative and in no way limiting purposes, with reference to the attached figures, among which:

In all figures, common elements bear the same reference numbers.

FIG. 1 is a simplified schematic representation of a broadcasting architecture 100 for the implementation of the method according to the invention.

Figure 1:
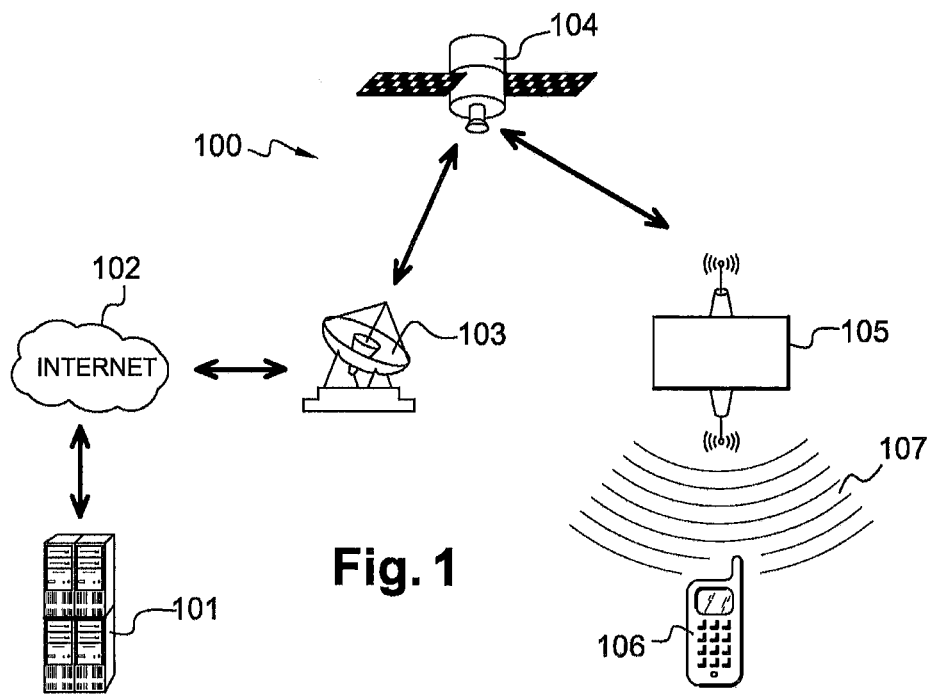
FIG. 1 is a simplified schematic representation of a broadcasting architecture for the implementation of the method according to the invention.

Architecture 100 mainly comprises:

a server transmitting in push mode 101 (here a single server is represented but one may also have several servers) exchanging data bidirectionally (typically via the Internet network 102) with a principal telecommunications ground station 103 ("gateway" or "hub");

a data distribution system such as a telecommunications satellite 104 exchanging data bidirectionally with the ground station 103;

an intelligent gateway (or interface device) 105 that will be described in further detail in reference to FIG. 2, satellite 104 communicating bidirectionally with the interface device 105;

mobile user terminals 106 (only one is represented) such as a PMP ("Portable Multimedia Player"), a PDA ("Personal Digital Assistant") or a mobile telephone, the mobile user terminals 106 communicating with the interface device 105 via a local wireless network 107 of the WiFi, WiMax or BlueTooth type.

Figure 2:
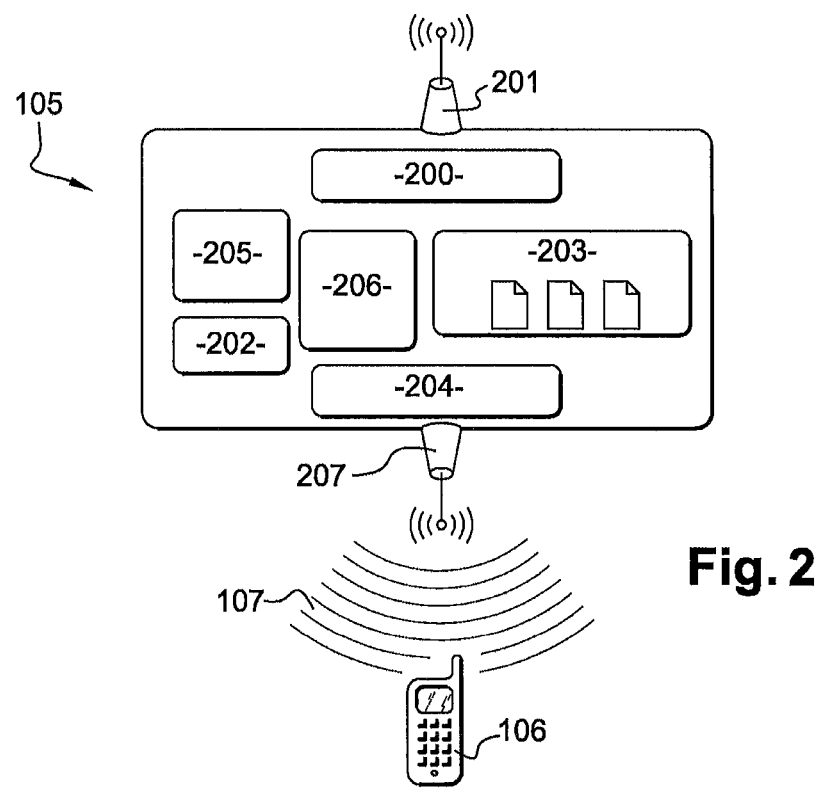
FIG. 2 is a simplified schematic representation of an interface device according to the invention.

FIG. 2 is a simplified schematic representation of the intelligent gateway 105 according to the invention.

The intelligent gateway 105 comprises:

satellite connection means 200 equipped with a satellite antenna 201;

means for storing said data 202;

a web server 203;

wireless means 204 for connecting to the local network 107 equipped with an antenna 207 (typically, it may be a connection of the WiFi, WiMax or BlueTooth type);

client means 205 to receive a data stream in push mode;

audio/video data stream routing means 206.

Server 101 transmits data in push mode; In other words, the data are periodically "pushed" to the intelligent gateway 105. To do this, the data pass through the ground station 103 and then are multicast by satellite 104 to a plurality of intelligent gateways 105 (i.e., the data are sent by the satellite to potentially reach all the connected intelligent gateways). Multicast broadcasting enables the cost of the satellite link to be optimized: The same data are broadcast at once to a plurality of gateways 105. We will subsequently deal with the case of a gateway 105 receiving these data. Server 101 and ground station 103 are for example connected to the Internet network 102.

The data are essentially of two types:
    content in the form of multimedia files;
    web applications intended to be executed locally on the user terminal.

The intelligent gateway 105 receives the data transmitted by the push server 101: The data are received by client means 205 to receive the stream of data in push mode that records them in the storage means 202 by respecting a file tree structure defined by the HTTP web server 203.

The principle of broadcasting contents in push mode is that there is no connection to initiate. To do this, the client means 205 to receive a stream of data in push mode integrate the software means that continuously listen to and receive that which is broadcast. A core application of the "portal" type is originally installed at the level of the web server 203. The connection to the web server 203 always directs to this portal. This portal is an application that "scans" the contents of directories and gives access to applications transmitted by push server 101 and present in device 105. Thus, when the push client receives a new application, the simple act of storing it in the storage means makes it accessible to the user terminals 106 through the portal.

Therefore, terminals 106 utilized by the end client do not need to be compatible with the reception of the satellite signal since they are connected to the wireless connection means 204 of gateway 105 through a local wireless network 107.

Communication between the web server 203 and a user terminal 106 connected to gateway 105 is based on the HTTP ("Hyper Text Transfer Protocol") protocol. This protocol enables terminal 106 to access applications, typically web pages in HTML ("Hyper Text Markup Language") format or dynamic web pages in PHP (Hypertext Preprocessor") format. The user terminal 106 must be equipped with a specific resource, called a browser, that is the client software capable of interrogating the web server 203, exploiting its results and formatting the information thanks to the information contained in the HTML or PHP pages.

In general, a user terminal 106 is connected to the web server 203 of the intelligent gateway 105 and never directly to the server 101.

In addition, as the applications are executed through the Internet browser of the terminal 106, it is no longer necessary to develop several versions of applications that are compatible with the various terminals present on the Market.

Typically, the provision of a music application on request by utilizing the intelligent gateway 105 comprises the following steps:
  Broadcasting by the server 101 the content of the offer by utilizing connections from the ground station 103 to the satellite 104 and from the satellite 104 to the intelligent gateway 105 (The music is stored in storage means 202).
  Broadcasting the web application by utilizing connections from the ground station 103 to the satellite 104 and from the satellite 104 to the intelligent gateway 105 (The application is also stored in storage means 202).
  On request from a terminal 106 connected to the intelligent gateway 105 (for example in WiFi), the HTTP server 203 executes the web application. This application is executed in the Internet browser of terminal 106. The end user may thus listen to the music stored in multimedia file form in the intelligent gateway 105.

Content data are capable of being updated regularly by server 101. For example, in the case of a weather application, meteorological data are updated by server 101 and stored in gateway 105.

It will be noted that the connection between the intelligent gateway 105 and the satellite 104 is a bidirectional connection such that the gateway 105 is capable of transmitting data passing through satellite 104 to server 101. These data may for example be data enabling the invoicing of terminal 106 users. We have thus considered in the foregoing that the communication between gateway 105 and server 101 is bidirectional and uses the forward and return links of satellite 104. However two possible variations exist:
  the connection between server 101 and gateway 105 may be unidirectional. In this case, gateway 105 may only receive information but may not send it back. This solution is possible since many applications do not require a return link (typically a weather application);
  the connection between server 101 and gateway 105 is hybrid: The satellite is then utilized as a broadcasting means while another type of connection, for example of the GPRS type, is utilized to enable gateway 105 to send data back to server 101. In this case, a location for a SIM ("Subscriber Identity Module") type card should be provided in the housing of gateway 105.

One particularly interesting application of the method according to the invention consists of installing the intelligent gateway 105 in the form of a housing on board an automobile. Consequently, gateway 105 will enable the vehicle occupants to take advantage of the connectivity by using their own terminals. For example, the occupant will only have to connect his mobile telephone to the gateway in his automobile to consult the weather, utilize music services on request or watch satellite television.

Concerning the possibility of watching satellite television, it will be noted that the intelligent gateway 105 is also equipped with a multicast audio/video data stream router 206. Thus, the intelligent gateway receives audio/video streams coming from server 101 via satellite 104 and these audio/video streams are sent back live (i.e., without being stored in storage means 202) to terminals 106 connected to the intelligent gateway by using the router 206 via the wireless connectivity means 204. The role of the router 206 is thus to redirect the stream to the mobile user terminals 106. It will only be used for live audio and video streams (for example to enable a user to watch a television channel on his mobile).

The method and the gateway device according to the invention enable the satellite bandwidth utilized to be optimized since the applications and data are sent by a multicast type connection (very suitable for satellite telecommunications), the return link being used sparingly when needed.

Of course, the invention is not limited to the embodiment that has just been described.

Therefore, the invention was more particularly described in the case where a distribution system is a satellite. Even if the invention is more particularly suitable for multicast broadcasting by satellite, it is also possible to use the invention by replacing the satellite by any media enabling data to be broadcast. For example, we may also utilize the digital terrestrial television or TNT as the distribution system instead of the satellite.

The invention claimed is:
1. A method for a push server to broadcast data to user terminals via an interface device, said data sent by the push server passing through a distribution system enabling the data to be broadcast from said push server to said interface device, said interface device comprising:
  a receptor configured to receive data multicast by said distribution system in push mode, the receptor including a client configured to receive a data stream in push mode, the client further being configured to continuously monitor transmissions from the distribution system;
  a storage device configured to store said data;
  a web server;
  a connector configured to establish a local wireless connection with user terminals;
  said method comprising
    transmitting by the push server a stream of content data and web application data to the distribution system;
    multicasting by the distribution system a stream of content data and web application data to said interface device;
    receiving said data by the receptor;
    storing said data in said storage device;
    establishing a wireless local connection of a terminal with a web browser to said interface device;

transmitting an HTTP query from said terminal to said web server, said query requesting the execution of an application stored in said storage device; and executing the requested application in the web browser of said terminal.

2. The method according to claim 1, wherein the connection between the interface device and the push server is a bidirectional connection.

3. The method according to claim 1, wherein said distribution system is a telecommunications satellite.

4. The method according to claim 3, wherein the connection between the push server and the interface device is a radiofrequency link between a principal ground station to which the push server is connected and the interface device via a telecommunications satellite.

5. The method according to claim 4, wherein the satellite is utilized bidirectionally such that the transmission of data from the push server to the interface device is carried out by utilizing the forward link of the satellite relaying the data transmitted by the principal ground station to the interface device and the transmission of data from the interface device to said push server is carried out by utilizing the return link of the satellite relaying the data transmitted by the interface device to the principal ground station.

6. The method according to claim 1, wherein said data are of two types:
content data integrated into multimedia files;
web applications intended to be executed locally on the user terminal.

7. The method according to claim 1, wherein the multicast broadcasting by the distribution system of the stream of content data and web applications data is done to a plurality of interface devices, each interface device ensuring the distribution of these data to user terminals connected to this interface device via its local wireless connection.

8. An interface device for implementing the method according to claim 1, the device comprising:
a receptor configured to receive data multicast by said distribution system in push mode, the receptor including a client configured to receive a data stream in push mode, the client further being configured to continuously monitor transmissions from the distribution system;
a storage device configured to receive said data;
a web server;
a connector configured to establish a local wireless connection with user terminals.

9. The device according to claim 8, wherein the device comprises a transmitter configured to transmit data to said push server.

10. The device according to claim 8, wherein the device comprises a router configured to route the data received to a user terminal connected to said interface device via said wireless connector.

11. The device according to claim 8, wherein the device comprises a satellite antenna.

12. The device according to claim 8, wherein the connector includes a WiFi, WiMax or BlueTooth connector.

13. An automobile integrating an interface device according to claim 8.

14. The method according to claim 1, wherein said wireless local connection is established with said interface device during a period of time when said interface device is unable to receive data from said distribution system.

15. A method for a push server to broadcast data to user terminals via an interface device, said data sent by the push server passing through a satellite enabling the data to be broadcast from said push server to said interface device via said satellite, said interface device comprising:
a receptor configured to receive data multicast by said distribution system in push mode, the receptor including a client configured to receive a data stream in push mode, the client further being configured to continuously monitor transmissions from the distribution system;
a storage device configured to store said data;
a web server;
a connector configured to establish a local wireless connection with user terminals;
said method comprising
transmitting by the push server a stream of content data and web application data to the satellite;
multicasting by the satellite the stream of content data and web application data to said interface device;
receiving said data by the receptor;
storing said data in said storage device;
establishing a wireless local connection of a terminal with a web browser to said interface device during a period of time when said interface device is unable to receive data from said satellite;
transmitting an HTTP query from said terminal to said web server during that period of time, said query requesting the execution of an application stored in said storage device; and
executing the requested application in the web browser of said terminal during that period of time.

* * * * *